United States Patent
Filev et al.

(10) Patent No.: US 8,788,113 B2
(45) Date of Patent: Jul. 22, 2014

(54) VEHICLE DRIVER ADVISORY SYSTEM AND METHOD

(75) Inventors: Dimitar Petrov Filev, Novi, MI (US); Ilya Vladimir Kolmanovsky, Novi, MI (US); Oleg Yurievitch Gusikhin, West Bloomfield, MI (US); Steven Joseph Szwabowski, Northville, MI (US); Perry Robinson MacNeille, Lathrup Village, MI (US); Christopher John Teslak, Plymouth, MI (US); Fazal Urrahman Syed, Canton, MI (US); Fling Tseng, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 328 days.

(21) Appl. No.: 13/158,620

(22) Filed: Jun. 13, 2011

(65) Prior Publication Data

US 2012/0316699 A1    Dec. 13, 2012

(51) Int. Cl.
*B60Q 7/00* (2006.01)
*G06F 19/00* (2011.01)

(52) U.S. Cl.
USPC ............................... 701/1; 701/57; 340/438

(58) Field of Classification Search
USPC .............. 701/1, 51, 123, 57, 58, 65; 340/438, 340/441, 439, 5.61, 5.54
See application file for complete search history.

(56) References Cited

U.S. PATENT DOCUMENTS

| | | | |
|---|---|---|---|
| 4,543,569 A | 9/1985 | Karlstrom | |
| 5,081,667 A | 1/1992 | Drori et al. | |
| 5,467,070 A | 11/1995 | Drori et al. | |
| 5,513,107 A | 4/1996 | Gormley | |
| 5,627,510 A | 5/1997 | Yuan | |
| 5,635,916 A | 6/1997 | Bucholtz et al. | |
| 5,655,081 A | 8/1997 | Bonnell et al. | |
| 5,734,336 A | 3/1998 | Smithline | |
| 5,776,031 A * | 7/1998 | Minowa et al. | ............... 477/155 |
| 5,828,319 A | 10/1998 | Tonkin et al. | |
| 5,874,889 A | 2/1999 | Higdon et al. | |

(Continued)

FOREIGN PATENT DOCUMENTS

| | | |
|---|---|---|
| CN | 1863052 | 11/2006 |
| CN | 101596895 A | 12/2009 |

(Continued)

OTHER PUBLICATIONS

Autobiometrics, Com, US Distributor for ATRD Biometric Immobilizer, http://www.autobiometrics.com, Jul. 6, 2011.

(Continued)

*Primary Examiner* — Tan Q Nguyen
(74) *Attorney, Agent, or Firm* — Jennifer M. Stec; Brooks Kushman P.C.

(57) ABSTRACT

An automotive vehicle may include at least one controller configured to monitor a plurality of parameters representing a driver's dynamic control of the vehicle and to establish a reference range based on values of the monitored parameters during a first time period. The at least one controller may be further configured to detect a change in driver behavior condition when, during a second time period, a parameter derived from the monitored parameters falls outside of the reference range, and in response to detecting the change in driver behavior condition, to alter a response of the vehicle to driver inputs or to generate output representing a recommendation to alter a response of the vehicle to driver inputs.

19 Claims, 1 Drawing Sheet

(56) References Cited

U.S. PATENT DOCUMENTS

| | | |
|---|---|---|
| 5,959,540 A | 9/1999 | Walter |
| 6,018,291 A | 1/2000 | Marble et al. |
| 6,133,825 A | 10/2000 | Matsuoka |
| 6,177,866 B1 | 1/2001 | O'Connell |
| 6,198,996 B1 | 3/2001 | Berstis |
| 6,263,282 B1 | 7/2001 | Vallancourt |
| 6,268,804 B1 | 7/2001 | Janky et al. |
| 6,271,745 B1 | 8/2001 | Anzai et al. |
| 6,282,226 B1 | 8/2001 | Furukawa |
| 6,434,455 B1 | 8/2002 | Snow et al. |
| 6,434,486 B1 | 8/2002 | Studt et al. |
| 6,438,491 B1 | 8/2002 | Farmer |
| 6,539,078 B1 | 3/2003 | Hunt et al. |
| 6,574,734 B1 | 6/2003 | Colson et al. |
| 6,590,495 B1 | 7/2003 | Behbehani |
| 6,668,221 B2 | 12/2003 | Harter, Jr. et al. |
| 6,679,702 B1 | 1/2004 | Rau |
| 6,690,260 B1 | 2/2004 | Ashihara |
| 6,737,963 B2 | 5/2004 | Gutta et al. |
| 6,754,562 B2 | 6/2004 | Strege et al. |
| 6,785,542 B1 | 8/2004 | Blight et al. |
| 6,810,309 B2 | 10/2004 | Sadler et al. |
| 6,853,919 B2 | 2/2005 | Kellum |
| 6,859,718 B2 | 2/2005 | Fritz et al. |
| 6,871,145 B2 | 3/2005 | Altan et al. |
| 6,906,619 B2 | 6/2005 | Williams et al. |
| 6,941,194 B1 | 9/2005 | Dauner et al. |
| 7,057,501 B1 | 6/2006 | Davis |
| 7,075,409 B2 | 7/2006 | Guba |
| 7,102,496 B1 | 9/2006 | Ernst, Jr. et al. |
| 7,124,027 B1 | 10/2006 | Ernst, Jr. et al. |
| 7,148,790 B2 | 12/2006 | Aoyama et al. |
| 7,161,563 B2 | 1/2007 | Vitale et al. |
| 7,173,903 B2 | 2/2007 | Remboski et al. |
| 7,194,069 B1 | 3/2007 | Jones et al. |
| 7,207,041 B2 | 4/2007 | Elson et al. |
| 7,228,213 B2 | 6/2007 | Sakai et al. |
| 7,246,062 B2 | 7/2007 | Knott et al. |
| 7,266,438 B2 | 9/2007 | Kellum et al. |
| 7,337,113 B2 | 2/2008 | Nakagawa et al. |
| 7,340,332 B2 | 3/2008 | Underdahl et al. |
| 7,356,394 B2 | 4/2008 | Burgess |
| 7,366,892 B2 | 4/2008 | Spaur et al. |
| 7,375,620 B2 | 5/2008 | Balbale et al. |
| 7,391,305 B2 | 6/2008 | Knoll et al. |
| 7,484,008 B1 | 1/2009 | Gelvin et al. |
| 7,565,230 B2 | 7/2009 | Gardner et al. |
| 7,602,782 B2 | 10/2009 | Doviak et al. |
| 7,783,475 B2 | 8/2010 | Neuberger et al. |
| 7,812,712 B2 | 10/2010 | White et al. |
| 7,826,945 B2 | 11/2010 | Zhang et al. |
| 8,050,817 B2 | 11/2011 | Moinzadeh et al. |
| 8,050,863 B2 | 11/2011 | Trepagnier et al. |
| 8,089,339 B2 | 1/2012 | Mikan et al. |
| 8,232,864 B2 | 7/2012 | Kakiwaki |
| 8,237,554 B2 | 8/2012 | Miller et al. |
| 8,258,939 B2 | 9/2012 | Miller et al. |
| 8,301,108 B2 | 10/2012 | Naboulsi |
| 8,305,189 B2 | 11/2012 | Miller et al. |
| 8,311,722 B2* | 11/2012 | Zhang et al. ............. 701/104 |
| 2001/0021891 A1* | 9/2001 | Kusafuka et al. .......... 701/57 |
| 2002/0013650 A1* | 1/2002 | Kusafuka et al. .......... 701/51 |
| 2002/0031228 A1 | 3/2002 | Karkas et al. |
| 2002/0096572 A1 | 7/2002 | Chene et al. |
| 2002/0097145 A1 | 7/2002 | Tumey et al. |
| 2003/0004730 A1 | 1/2003 | Yuschik |
| 2003/0055643 A1 | 3/2003 | Woestemeyer et al. |
| 2003/0079123 A1 | 4/2003 | Mas Ribes |
| 2003/0217148 A1 | 11/2003 | Mullen et al. |
| 2003/0220725 A1 | 11/2003 | Harter, Jr. et al. |
| 2003/0231550 A1 | 12/2003 | Macfarlane |
| 2004/0046452 A1 | 3/2004 | Suyama et al. |
| 2004/0073367 A1 | 4/2004 | Altan et al. |
| 2004/0088205 A1 | 5/2004 | Geisler et al. |
| 2004/0124968 A1 | 7/2004 | Inada et al. |
| 2004/0176906 A1 | 9/2004 | Matsubara et al. |
| 2004/0227642 A1 | 11/2004 | Giles et al. |
| 2004/0236475 A1 | 11/2004 | Chowdhary |
| 2005/0021597 A1 | 1/2005 | Derasmo et al. |
| 2005/0033517 A1 | 2/2005 | Kondoh et al. |
| 2005/0125110 A1 | 6/2005 | Potter et al. |
| 2005/0134115 A1 | 6/2005 | Betts, Jr. et al. |
| 2005/0177635 A1 | 8/2005 | Schmidt et al. |
| 2005/0190039 A1 | 9/2005 | Aoyama |
| 2005/0193212 A1 | 9/2005 | Yuhara |
| 2005/0261816 A1 | 11/2005 | DiCroce et al. |
| 2006/0056663 A1 | 3/2006 | Call |
| 2006/0142917 A1 | 6/2006 | Goudy |
| 2006/0150197 A1 | 7/2006 | Werner |
| 2006/0156315 A1 | 7/2006 | Wood et al. |
| 2006/0220904 A1 | 10/2006 | Jarlengrip |
| 2006/0250224 A1 | 11/2006 | Steffel et al. |
| 2006/0293813 A1 | 12/2006 | Nou |
| 2007/0027595 A1 | 2/2007 | Nou |
| 2007/0050854 A1 | 3/2007 | Cooperstein et al. |
| 2007/0072616 A1 | 3/2007 | Irani |
| 2007/0100514 A1 | 5/2007 | Park |
| 2007/0103339 A1 | 5/2007 | Maxwell et al. |
| 2007/0255568 A1 | 11/2007 | Pennock |
| 2008/0070616 A1 | 3/2008 | Yun |
| 2008/0109653 A1 | 5/2008 | Yokohama |
| 2008/0148374 A1 | 6/2008 | Spaur et al. |
| 2008/0150683 A1 | 6/2008 | Mikan et al. |
| 2008/0275604 A1 | 11/2008 | Perry et al. |
| 2009/0030605 A1 | 1/2009 | Breed |
| 2009/0045928 A1 | 2/2009 | Rao et al. |
| 2009/0096596 A1 | 4/2009 | Sultan et al. |
| 2009/0167524 A1 | 7/2009 | Chesnutt et al. |
| 2009/0184800 A1 | 7/2009 | Harris |
| 2009/0195370 A1 | 8/2009 | Huffman et al. |
| 2009/0275281 A1 | 11/2009 | Rosen |
| 2009/0309709 A1 | 12/2009 | Bevacqua et al. |
| 2010/0004818 A1 | 1/2010 | Phelan |
| 2010/0007479 A1 | 1/2010 | Smith |
| 2010/0013596 A1 | 1/2010 | Kakiwaki |
| 2010/0030458 A1* | 2/2010 | Coughlin ............. 701/123 |
| 2010/0039224 A1 | 2/2010 | Okude et al. |
| 2010/0057586 A1 | 3/2010 | Chow |
| 2010/0075656 A1 | 3/2010 | Hawarter et al. |
| 2010/0097178 A1 | 4/2010 | Pisz et al. |
| 2010/0148923 A1 | 6/2010 | Takizawa |
| 2010/0178872 A1 | 7/2010 | Alrabady et al. |
| 2010/0191535 A1 | 7/2010 | Berry et al. |
| 2010/0191973 A1 | 7/2010 | Huntzicker et al. |
| 2010/0321203 A1 | 12/2010 | Tieman et al. |
| 2011/0009107 A1 | 1/2011 | Guba et al. |
| 2011/0071720 A1 | 3/2011 | Schondorf et al. |
| 2011/0071725 A1 | 3/2011 | Kleve et al. |
| 2011/0071734 A1 | 3/2011 | Van Wiemeersch et al. |
| 2011/0102146 A1 | 5/2011 | Giron |
| 2011/0105097 A1 | 5/2011 | Tadayon et al. |
| 2011/0106374 A1 | 5/2011 | Margol et al. |
| 2011/0112969 A1 | 5/2011 | Zaid et al. |
| 2011/0148574 A1 | 6/2011 | Simon et al. |
| 2011/0166748 A1 | 7/2011 | Schneider et al. |
| 2011/0213629 A1 | 9/2011 | Clark et al. |
| 2011/0215921 A1 | 9/2011 | Ayed et al. |
| 2011/0275321 A1 | 11/2011 | Zhou et al. |
| 2011/0295444 A1 | 12/2011 | Westra et al. |
| 2012/0041633 A1 | 2/2012 | Schunder et al. |
| 2012/0054036 A1 | 3/2012 | Nam et al. |
| 2012/0071140 A1 | 3/2012 | Oesterling et al. |
| 2012/0139760 A1 | 6/2012 | Bevacqua et al. |
| 2012/0157069 A1 | 6/2012 | Elliott et al. |
| 2012/0280786 A1 | 11/2012 | Miller et al. |
| 2012/0284702 A1 | 11/2012 | Ganapathy et al. |
| 2012/0293317 A1* | 11/2012 | Hanna et al. ............. 340/441 |
| 2012/0313768 A1 | 12/2012 | Campbell et al. |
| 2013/0005302 A1 | 1/2013 | Ozaki |
| 2013/0162421 A1 | 6/2013 | Inaguma et al. |
| 2013/0200999 A1 | 8/2013 | Spodak et al. |

(56) References Cited

U.S. PATENT DOCUMENTS

FOREIGN PATENT DOCUMENTS

| DE | 102007046270 A1 | 4/2009 |
|----|----|----|
| EP | 0449471 | 10/1991 |
| EP | 0971463 | 1/2000 |
| EP | 1095527 | 5/2001 |
| JP | 2008195253 | 8/2008 |
| JP | 2008303630 | 12/2008 |
| WO | WO0125572 A1 | 4/2001 |
| WO | 2009158469 | 12/2009 |
| WO | 2012015403 | 2/2013 |

OTHER PUBLICATIONS

SALES@usasupremetech.com, In the U.S. a Car is Stolen Every 26 Seconds, The Wave of the Future, Biometrics Authentication, An Introduction.

Ford Motor Company, "SYNC with Navigation System," Owner's Guide Supplement, SYNC System Version 1 (Jul. 2007).

Ford Motor Company, "SYNC," Owners's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem," Automotive Design & Production, Oct. 2003, http://findarticles.com, pp. 103.

Juha Leino et al., Case Amazon: Ratings and Reviews as Part of Recommendations, RecSys '07, Oct. 19-20, 2007, pp. 137-140, Minneapolis, Minnesota, USA, Copyright 2007 ACM 978-1-59593-730-8/07/0010.

Toine Bogers et al., Comparing and Evaluating Information Retrieval Algorithms for News Recommendation, RecSys '07, Oct. 19-20, 2007, 4 pgs., Minneapolis, Minnesota, USA, Copyright 2007 ACM 978-1-59593-730-08/07/0010.

Mike Radmacher, Elicitation of Profile Attributes by Transparent Communication, RecSys '07, Oct. 19-20, 2007, pp. 199-202, Minneapolis, Minnesota, USA, Copyright 2007 ACM 978-1-59593-730-08/07/0010.

Marco Tiemann et al., Ensemble Learning for Hybrid Music Recommendation, 2007, 2 pgs., Austrian Computer Society (OCG).

J.J. Sandvig et al., Robustness of Collaborative Recommendation Based on Association Rule Mining, RecSys '07, Oct. 19-20, 2007, 7 pgs., Minneapolis, Minnesota, USA, Copyright 2007 ACM 978-1-59593-730-8/07/0010.

Jill Freyne et al., Toward the Exploitation of Social Access Patterns for Recommendation, RecSys '07, Oct. 19-20, 2007, 4 pgs., Minneapolis, Minnesota, USA, Copyright 2007 ACM 978-1-59593-730-8/07/0010.

Liu Qiao et al., Self-Supervised Learning Algorithm of Environment Recognition in Driving Vehicle, IEEE Transactions on Systems, Man, and Cybernetics-Part A: Systems and Humans, vol. 26, No. 6, Nov. 1996, pp. 843-850.

Yasuhiro Yokoi et al., Driving Pattern Prediction for an Energy Management System of Hybrid Electric Vehicles in a Specific Driving Course, The 30th Annual Conference of the IEEE Industrial Electronics Society, Nov. 2-6, 2004, Busan, Korea, pp. 1727-1732.

Randy Allen Harris, Voice Interaction Design: Crafting the New Conversational Speech Systems (Morgan Kaufmann Series in Interactive Technologies); Morgan Kaufmann (Dec. 27, 2004), Chapters 3, 11 and 15, 65 pgs.

It's What Makes a Subaru, a Subaru: Subaru Intelligent Drive (SI-DRIVE), http://drive2.subaru.com/Summer07_whatmakes.htm, Summer 2007, 2 pgs.

Jeffrey M. O'Brien, The Race to Create a 'Smart' Google, CNN Money, Fortune Magazine, Nov. 27, 2006, http://money.cnn.com/magazines/fortune/fortune_archive/2006/11/27/8394347/, 4 pgs.

I.V. Kolmanovsky et al., Speed Gradient Control of Nonlinear Systems and Its Applications to Automotive Engine Control, 2008 SICE, 8 pgs.

Recommender System, Wikipedia, The Free Encyclopedia, Aug. 10, 2012, 5 pgs., https://secure.wikimedia.org/wikipedia/en/w/index.php?title=Recommender_system&oldid=201146474.

Collaborative Filtering, Wikipedia, The Free Encyclopedia, Aug. 10, 2012, 7 pgs., https://secure.wikimedia.org/wikipedia/en/w/index.php?title=Collaborative_filtering&oldid=199820810.

\* cited by examiner

VEHICLE DRIVER ADVISORY SYSTEM AND METHOD

BACKGROUND

Different drivers may prefer different performance characteristics from the same vehicle. One driver, for example, may prefer performance characteristics that emphasize fuel economy. Another driver may prefer performance characteristics that emphasize response and handling.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Introduction

The increasing intelligence and autonomy of automotive vehicles may significantly alter the customer driving experience. The growing connectivity of vehicles via digital communications, proliferation of navigation and road information systems, and advancements in computing and inexpensive sensor technology create numerous opportunities to improve vehicle performance by incorporating the wealth of information about driving conditions. The customization of vehicle response to individual customer preferences is also of significant interest.

Figure 1:
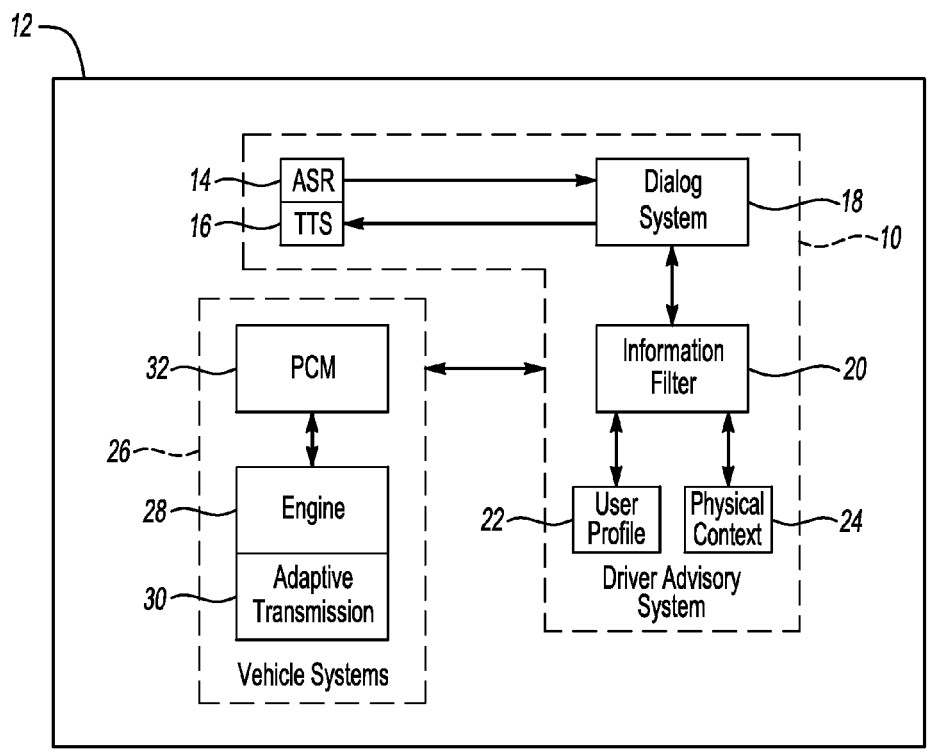
FIG. 1 is an architecture diagram for an intelligent integrated driver-vehicle interface.

In FIG. 1, we consider a driver assistance system (DAS) 10 of a vehicle 12. The DAS 10 may be implemented, in certain embodiments, in one or more processors/controllers and include automatic speech recognition (ASR) and text-to-speech (TTS) modules 14, 16, a spoken dialog system (SDS) 18, an information filter 20, a user profile database 22, and a physical context database 24. The vehicle 12 may also include vehicle systems 26, such as an engine 28, an adaptive transmission 30, a powertrain control module (PCM) 32, accelerator and brake systems (including accelerator and brake pedals respectively), sensor systems (e.g., speed sensor, accelerator pedal position sensor, brake pedal position sensor, etc.), a steering system (including a steering wheel), etc. The DAS 10 may communicate with the vehicle systems 26 via a multiplex network such as a Controller Area Network (CAN).

The DAS 10 may cause the customization of vehicle powertrain response to driver preferences. These preferences may be communicated by the driver via the SDS 18, or learned over time and proactively suggested to the driver by the vehicle 12. The SDS 18 processes driver voice commands and other driver-supplied information. The information filter 20 may combine information from vehicle systems (e.g., information from any of the vehicle control modules or sensors on-board the vehicle), navigation and road information system, or wireless Internet to change the strategy parameters in the PCM 32. The information filter 20 may examine the direct driver inputs (e.g., inputs indicative of the immediate driver preferences), information about the present road conditions and other information to determine the best performance mode at any given time.

The DAS 10 may change powertrain performance mode, for example, between sport mode, normal mode, comfort mode, luxury mode and fuel economy mode based on driver preferences, for example, communicated or confirmed via voice commands. In the fuel economy mode, powertrain operation is configured to enhance fuel economy with some potential degradation in acceleration performance, while the sport mode enhances acceleration performance and vehicle responsiveness. The so-called normal mode is an intermediate mode, which is configured to balance vehicle fuel economy and acceleration performance attributes. The comfort or luxury mode may optimize powertrain smoothness to enhance driver comfort. The DAS 10 may also have a proactive performance mode advisory function to recommend a performance mode to the driver depending on the observations of recent driver actions as determined through data collected from a collection of vehicle and non-vehicle sources, as well as knowledge of past driver actions and preferences.

Spoken Dialog System

The SDS 18 may use verbal interaction between the driver and the vehicle 12 to avoid the hazards of look away events, to make the DAS 10 easy to use, and to save space on the dashboard. FIG. 1 shows the basic architecture of the SDS interface.

Operating mode recommendations and the current operating mode may be computed in the vehicle systems 26 and passed to the SDS 18 on a periodic basis (e.g., about every 10 seconds). When the recommended mode differs from the current mode, the SDS 18 may initiate a verbal exchange with the driver. The information filter 20 may ensure that verbal interactions with the driver take place at appropriate times, such as when a driver response is necessary, when the driver is able to make a decision, or when the driving environment is suitable. It may also ensure that requests are not made too frequently.

If the recommended performance mode differs from the actual performance mode, the information filter 20 may initiate changing the mode by suggesting the recommended mode to the driver. The decision to initiate may be based on the level of certainty that the recommended mode would be helpful, the amount of time passed since the last recommendation was made, learned driver preferences from the user profile database 22, and/or contextual information from sensors and the Internet.

The approach used to determine the recommended performance mode setting is presented in detail below, but from the perspective of the SDS 18, the intent is to issue recommendations when it is appropriate for the driver to receive a recommendation. The information filter 20 makes sure that the driver does not receive recommendations too frequently causing distraction, frustration or dissatisfaction with the DAS 10.

To issue a recommendation, the information filter 20 sends a message to the dialog system 18 and then waits for a response. Upon receiving the message, the dialog system 18 creates a text string containing the words the driver should hear, such as "Would you like to switch to economy mode? I think you might get better fuel economy." This string is then sent in a message to the TTS module 16, and the dialog system 18 waits for a response from the driver.

Upon receiving the text string, the TTS module 16 creates audible spoken words corresponding to the words in the string. The driver upon hearing the words formulates a response which is likely to be "yes" or "no," but could be something more unexpected like "What is a performance mode?" or "Ask me later."

The ASR module 14 detects the driver's response and converts it into a text string which it sends to the dialog system 18 in a message. The dialog system 18 creates an appropriate response which it sends to the TTS module 16, and then sends a message containing the meaning of the driver's response to the information filter 20. Based on the driver's response, the information filter 20 will either send a message to the PCM 32 to change the performance mode or not.

It is assumed that it is better to use an SDS that approximates conversational speech than one that uses individual utterances to move through a menu hierarchy. A conversational approach may have several advantages including that it is easier, more comfortable and more convenient to use than a hierarchical system. There are also advantages related to performance of the system such as better recognition. Either type (or a different type) of system, however, may be used.

The SDS 18 is capable of acting in either a proactive or directed manner. In the directed manner, the driver recognizes the need for a change in the mode, and requests the change from the SDS 18. This would begin with a statement from the driver such as "Please switch to economy mode." The SDS 18 responds by saying "Ok, I will switch to economy mode." The system then pauses for a second or so, in case a recognition error has occurred, in which case the driver would say something like "No, I said sport mode" and the SDS 18 says "Ok, I'll switch to sport mode." After the switch is made, the SDS 18 may say "I've switched to sport operating mode." Each time the driver directs the SDS 18, the change is logged and later compiled into the user profile database 22.

When the SDS 18 acts in proactive mode, it may try to make the driver aware of the possibility of changing the operating mode functionality when a good time to change operating mode occurs. It may say something like "Would you like to switch to fuel economy operating mode? I think you could save money on gas, but it might take longer to speed up." If the driver were to say yes, the SDS 18 would respond by saying "I've switched to economy mode." Based on the number of times the proactive mode has been used, the SDS 18 may say "You know, you can switch driving mode yourself Would you like me to explain?" The information filter 20 learns from the responses the driver gives, and bases future decisions on those responses.

Proactive Vehicle Performance Advisory System

A goal of the proactive vehicle performance advisory system may be to create a "driver-aware" vehicle that appeals to the driver by maximizing the driver's preferences of vehicle performance and allows the opportunity for performance personalization while leaving to the driver full responsibility and control of the vehicle 12. The system may estimate the current preferences of the driver in terms of acceleration performance versus fuel economy. They are later used to recommend to the driver a powertrain mode that is selected from a set of available performance mode configurations, such as sport, normal and fuel economy, and possibly including such aspects as throttle response and transmission shift performance.

Data captured from vehicle and non-vehicle sources can provide a significant resource to determine the characteristics and preferences of the driver. "Parameters" that may be considered include the accelerator pedal, vehicle speed, engine speed, driver commanded PRNDL or gear (select shift), actual transmission gear position, brake pedal position, brake pressure, and steering wheel angle (and derivatives of these signals) together with roadway speed limits, roadway type (multi-lane expressway, single lane county road, etc.), traffic volume, and patterns of these data may serve, in certain embodiments, as potential factors defining a driver's intent. Observation of these parameters individually or in various combinations over time may be used to characterize the driving style and determine the driver's performance preferences.

One may employ computational intelligence techniques (neural, fuzzy, clustering, etc.), hidden Markov methods, Baysian networks, or any other suitable/available technique to adopt the statistical concepts of common and special variation. We wish to identify unusual variations relative to the long term behaviour observed for the driver. Special variations (or anomalies) are those things that indicate a change in behaviour relative to the typical behaviour, such as a change in the location (e.g. mean value or variation) of a parameter (e.g., accelerator pedal position, etc.) that has been observed over a recent time horizon. These anomalies, when observed over a period of time, may indicate that the preferences of the driver have changed and that the system should now consider a new operating mode more consistent with the driver's current preferences. For example, a driver in city driving conditions may prefer highly responsive performance, but after entering the highway where they wish to maintain a constant speed, may prefer that the speed control system be activated. In this way, we are effectively learning a model of the driver and their preferences, which may change over time (time of day, day of week, etc.) and change due to different driving conditions (road type, weather, etc.)

Assume, for example, that the PCM 32 utilizes two driver input parameters, accelerator pedal position (available, for example, via CAN) and its derivative, and generates a covariance relative to an averaged version of these signals representing the driver's recent driving behaviour. It is then possible for the PCM 32 to generate a metric descriptive of the amount of variation in these parameters relative to the driver's typical behaviour utilizing a determinant of the resulting covariance matrix for instance. This determinant can then be compared to a set of thresholds generated based on the mean and variance of the determinant: an upper threshold equal to, for example, the mean plus three times the standard deviation of the determinant (indicative of change in driver behaviour in a more sporty or aggressive sense), and a lower threshold equal to, for example, the mean minus three times the standard deviation of the determinant (indicative of a change in driver behaviour in a more casual or cautious sense). Since there can be significant variability among individual drivers (and among driving styles of a specific driver over time), the thresholds may be allowed to change in relation to the average and variation of the metric (e.g., determinant) observed over time.

When the calculated metric exceeds the upper threshold(s) or falls below the lower threshold(s) for more than a calibratable period of time, the PCM 32 may conclude that the driver's behaviour has significantly changed relative to their typical behaviour (that is, a change in driver behaviour condition has occurred). The PCM 32 may then seek to alter a response of the vehicle 12 to driver inputs as discussed herein or forward this information to the DAS 10 so that a recommendation may be generated to inform the driver that a different performance mode may be more appropriate. While the above example is directed to accelerator and accelerator rate parameters, it could be applied to any combination of parameters in a similar manner, each with their own metrics and thresholds, which can be utilized individually as already described above or combined to form a composite metric having distinct adaptive thresholds. Also, the information filter 20 (or any other controller(s)/processor(s)) may perform the algorithms described above with reference to the PCM 32.

When anomalies in driver behaviour are observed, and a decision is made that the driver preferences have indeed changed, a decision may be made to determine the most appropriate mode to implement or recommend to the driver. This decision is based on the parameters which are applied to a learned rule base, driver intention model. As an example of this approach, assuming the use of driver torque request and vehicle speed parameters, the estimated driving style may be characterized as "abrupt" or "smooth" as manifested by the variability of the torque request. Similarly, driver's performance preference may be defined as "sporty" or "relaxed" based on vehicle speed and acceleration. A decision making mechanism assigns an appropriate performance mode to different combinations of, for example, the driving style, performance preference, and the average vehicle speed. The proactive vehicle performance advisory system may then, in certain embodiments, communicate its recommendation for the appropriate performance mode through the information filter 20 to the SDS 18. An affirmative response to the recommendation may cause, for example, the DAS 10 to instruct the PCM 32 to implement the recommended performance mode.

The mode selection decision logic may be summarized in the following example meta-rules:
1. If driving style is "smooth" AND average speed is "low," recommend shifting to a "lower" performing powertrain mode.

Smooth torque request and low vehicle speed indicate that a lesser performing mode, if available, may be adequate. If the fuel economy mode has already been selected, the system would not generate any recommendation.
2. If driving style is "abrupt" AND driver's performance preference is "sporty," recommend shifting to a "higher" performing powertrain mode.

High level of accelerator pedal activity is indicative of a driver looking for more performance to accomplish an intended "sporty" style of driving. By recommending a higher performing powertrain mode, it alleviates the need of the driver to overly manoeuvre the accelerator pedal, and better accommodate the driver's performance preference.
3. If the driving style is "smooth" AND average speed is "high," recommend cruise control.

The rationale for this rule is that the driver is already at a speed great enough for the cruise control function to be applicable, and at the same time exhibiting the intention of maintaining almost constant speed by minimizing the usage of acceleration pedal or changes in the vehicle speed. A recommendation of using cruise control has the potential of fulfilling the needs of the driver and improving the fuel economy.
4. If driving style is "abrupt" AND driver's performance preference is "relaxed," recommend cruise control.

Recommending cruise control matches the intended style of smooth vehicle speed and acceleration. Additionally, improved fuel economy is achieved because the use of cruise control generally minimizes the fluctuations of the power being requested from the powertrain.

The special variation being a change relative to the "typical" behaviour relies on threshold values determined by these typical behaviours. Since all drivers are unique, it is not likely that a set of fixed thresholds would be appropriate. Therefore, the transition thresholds may be updated continuously while the vehicle is driven to conform to the behaviours specific to each driver. Typical behaviour is then determined to be a situation in which a parameter lies within these thresholds. An anomaly is determined to be a situation in which a parameter lies outside of these thresholds for a sufficient period of time.

Powertrain Performance Modes

With the above discussed features, the vehicle 12 is able to assist the driver in selecting/implementing the most appropriate performance configuration, or alternatively to provide an easy to use voice controlled vehicle performance mode configuration interface. Some of the implementations discussed may rely on the selection from one of three available accelerator pedal transition mappings to affect the vehicle performance through a trade-off between acceleration responsiveness and fuel economy.

Figure 2:
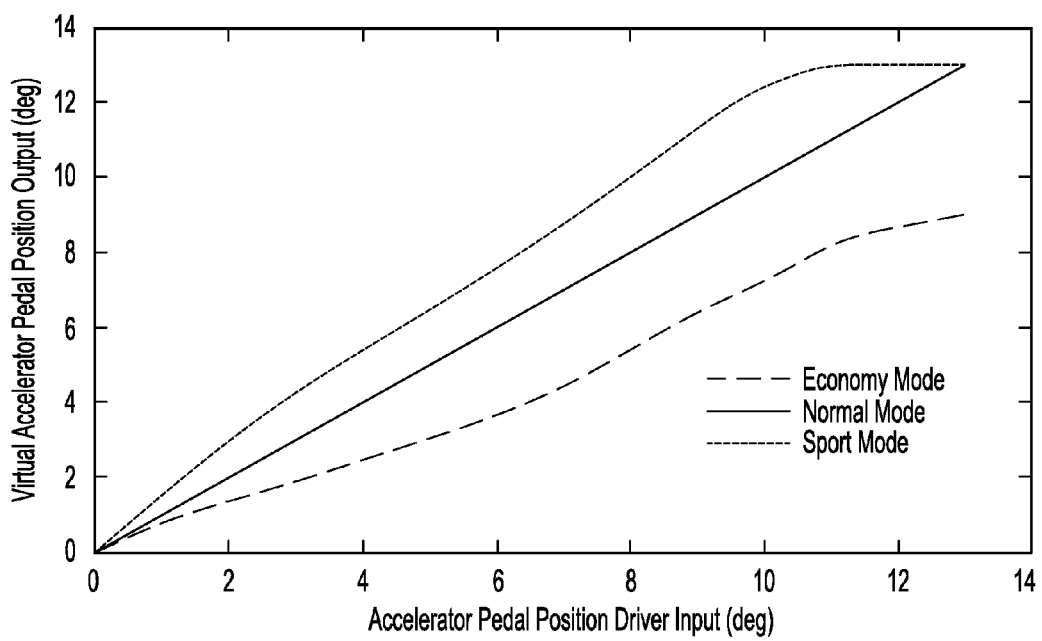
FIG. 2 is a plot of virtual accelerator pedal position output versus accelerator pedal position driver input.

The sport mode setting may be configured to enhance acceleration performance feel by delivering more power for smaller accelerator pedal inputs. The driver may activate the sport mode setting when desiring all of the power of the vehicle to accelerate (e.g., when in a hurry, during passing, or in an emergency situation). The pedal translation map for the sport mode setting results in higher pedal sensitivity. (See FIG. 2.)

The comfort or luxury mode may be configured to enhance vehicle smoothness by reducing the accelerator pedal sensitivity over the normal range of accelerator inputs. In the fuel economy mode, a pedal translation map may be created to cause the transmission to up shift earlier for the same driver foot angle input as compared to the normal or sport modes. The intent is that the fuel economy mode is activated when the driver would like to reduce vehicle fuel consumption, extend vehicle driving range without refueling, or reduce fuel costs.

The normal mode is an intermediate performance mode that results from an intention to balance sportiness, fuel economy and luxury smoothness in a single mode. In the normal mode, the pedal to torque sensitivity may be less steep in certain ranges of the pedal travel.

Other implementations may additionally/alternatively alter the sensitivity of the steering system to steering inputs using known techniques. The implementation of, for example, sport mode may result in increased steering response for a given steering input while the implementation of comfort mode may result in decreased steering response for a given steering input. Other scenarios are also contemplated.

We described the development of a system for selecting a powertrain operating mode using, in certain embodiments, an SDS 18 and voice commands (manual input systems, however, are also contemplated). This hands-free/eyes-free capability when combined with the intelligence offered by the proactive vehicle performance advisory system is able to, for example, implement (or recommend) an accelerator pedal configuration which is tailored to the driver. Whether the driver values fuel economy or responsive acceleration, this system may address the diversity of drivers and driving styles with the objective of ultimately delivering improved customer satisfaction.

The algorithms disclosed herein may be deliverable to/implemented by a processing device, such as the DAS 10, information filter 20, PCM 32, etc., which may include any existing electronic control unit or dedicated electronic control unit, in many forms including, but not limited to, information permanently stored on non-writable storage media such as ROM devices and information alterably stored on writeable storage media such as floppy disks, magnetic tapes, CDs, RAM devices, and other magnetic and optical media. The algorithms may also be implemented in a software executable object. Alternatively, the algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
a controller configured to (i) monitor parameters representing a driver's dynamic control of the vehicle, (ii) derive a reference range from values of the monitored parameters during a first time period, (iii) detect a change in behavior when, during a second time period, a parameter derived from the monitored parameters falls outside of the reference range, and (iv) in response to detecting the change in behavior, alter a response of the vehicle to driver inputs.

2. The vehicle of claim 1 wherein the controller is further configured to, during the second time period, categorize aspects of the driver's dynamic control of the vehicle based on the monitored parameters or the parameter derived from the monitored parameters.

3. The vehicle of claim 2 wherein the controller is further configured to determine a manner in which to alter the response of the vehicle to driver inputs based on the categorization.

4. The vehicle of claim 1 wherein altering a response of the vehicle to driver inputs includes selecting an accelerator pedal transition mapping.

5. The vehicle of claim 1 wherein altering a response of the vehicle to driver inputs includes increasing or decreasing an accelerator pedal sensitivity.

6. The vehicle of claim 1 wherein altering a response of the vehicle to driver inputs includes increasing or decreasing a steering wheel sensitivity.

7. The vehicle of claim 1 wherein establishing a reference range based on values of the monitored parameters includes determining at least one of a mean and variance of the parameter derived from the monitored parameters.

8. The vehicle of claim 1 wherein the reference range is defined by a mean and variance of the parameter derived from the monitored parameters.

9. An automotive vehicle comprising:
at least one controller configured to (i) monitor a plurality of parameters representing a driver's dynamic control of the vehicle, (ii) establish a reference range based on values of the monitored parameters during a first time period, (iii) detect a change in driver behavior condition when, during a second time period, a parameter derived from the monitored parameters falls outside of the reference range, and (iv) in response to detecting the change in driver behavior condition, generate output representing a recommendation to alter a response of the vehicle to driver inputs.

10. The vehicle of claim 9 wherein the at least one controller is further configured to receive input representing a response to the recommendation and to alter the response of the vehicle to driver inputs if the response is affirmative.

11. The vehicle of claim 10 wherein altering a response of the vehicle to driver inputs includes selecting an accelerator pedal transition mapping.

12. The vehicle of claim 10 wherein altering a response of the vehicle to driver inputs includes increasing or decreasing an accelerator pedal sensitivity.

13. The vehicle of claim 10 wherein altering a response of the vehicle to driver inputs includes increasing or decreasing a steering wheel sensitivity.

14. The vehicle of claim 9 wherein the at least one controller is further configured to categorize aspects of the driver's dynamic control of the vehicle based on the monitored parameters or the parameter derived from the monitored parameters.

15. The vehicle of claim 14 wherein the at least one controller is further configured to determine a manner in which to alter the response of the vehicle to driver inputs based on the categorization.

16. A method for tuning a vehicle's response to driver inputs comprising:
monitoring a plurality of parameters representing a driver's dynamic control of the vehicle;
establishing a reference range based on values of the monitored parameters during a first time period;
detecting a change in driver behavior condition when, during a second time period, a parameter derived from the monitored parameters falls outside of the reference range; and
in response to detecting the change in driver behavior condition, (i) generating output representing a recommendation to alter a response of the vehicle to driver inputs or (ii) altering a response of the vehicle to driver inputs.

17. The method of claim 16 wherein altering a response of the vehicle to driver inputs includes selecting an accelerator pedal transition mapping.

18. The method of claim 16 wherein altering a response of the vehicle to driver inputs includes increasing or decreasing an accelerator pedal sensitivity.

19. The method of claim 16 wherein altering a response of the vehicle to driver inputs includes increasing or decreasing a steering wheel sensitivity.

* * * * *